US012604090B2

(12) United States Patent
Kimura

(10) Patent No.: US 12,604,090 B2
(45) Date of Patent: Apr. 14, 2026

(54) INFORMATION PROCESSING APPARATUS THAT CONTROLS A CAMERA OF A COMMUNICATION DEVICE IF AN ASSOCIATED ANNOTATION EXISTS IN A MANAGEMENT TABLE, INFORMATION PROCESSING METHOD, AND STORAGE MEDIUM

(71) Applicant: Canon Kabushiki Kaisha, Tokyo (JP)

(72) Inventor: Yusuke Kimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 87 days.

(21) Appl. No.: 18/528,900

(22) Filed: Dec. 5, 2023

(65) Prior Publication Data

US 2024/0214675 A1 Jun. 27, 2024

(30) Foreign Application Priority Data

Dec. 21, 2022 (JP) ................................ 2022-204075

(51) Int. Cl.
    *H04N 23/661*     (2023.01)
    *H04N 23/69*     (2023.01)
    *H04N 23/695*     (2023.01)

(52) U.S. Cl.
    CPC ........... *H04N 23/662* (2023.01); *H04N 23/69* (2023.01); *H04N 23/695* (2023.01)

(58) Field of Classification Search
    CPC ..................... G06V 20/52; G06T 2207/30232;
    H04N 7/18; H04N 7/181; H04N 7/183; H04N 7/185; H04N 23/662; H04N 23/69; H04N 23/695; H04N 23/60; H04N 23/661
    See application file for complete search history.

(56) References Cited

U.S. PATENT DOCUMENTS

| | | | | |
|---|---|---|---|---|
| 8,692,846 B2 * | 4/2014 | Yamamoto | .............. | G06T 11/60 382/284 |
| 9,264,765 B2 * | 2/2016 | Sasaki | .............. | H04N 21/21805 |
| 10,812,728 B2 * | 10/2020 | Niga | .................... | H04N 23/631 |
| 12,387,344 B2 * | 8/2025 | Yachida | .............. | H04N 23/695 |
| 2004/0119819 A1 * | 6/2004 | Aggarwal | ........ | G08B 13/19641 348/E7.086 |
| 2006/0222209 A1 * | 10/2006 | Zhang | .................. | G08B 29/188 382/107 |
| 2006/0227997 A1 * | 10/2006 | Au | .......................... | G08B 25/14 382/103 |
| 2006/0244826 A1 * | 11/2006 | Chew | ...................... | G06T 7/254 348/E7.086 |

(Continued)

FOREIGN PATENT DOCUMENTS

JP      2018026672 A      2/2018

*Primary Examiner* — Chiawei Chen
(74) *Attorney, Agent, or Firm* — Venable LLP

(57) ABSTRACT

An information processing apparatus capable of communicating with a communication device, comprising: a receiving unit; and a control unit configured to, in a case in which the receiving unit receives a notification satisfying a predetermined condition from the communication device, search for an annotation related to the condition from a predetermined annotation management table, and direct a camera to the annotation that matches, wherein the control unit executes a predetermined operation based on a rule set in advance in a case in which the camera is directed towards the annotation.

9 Claims, 7 Drawing Sheets

(56) References Cited

U.S. PATENT DOCUMENTS

| | | | |
|---|---|---|---|
| 2010/0295944 A1* | 11/2010 | Takeuchi | G06V 20/52 |
| | | | 382/103 |
| 2011/0199487 A1* | 8/2011 | Husoy | H04N 7/181 |
| | | | 348/E7.085 |
| 2017/0019590 A1* | 1/2017 | Nakamura | G06V 40/161 |
| 2018/0165828 A1* | 6/2018 | Sasatani | G06V 40/10 |
| 2018/0343398 A1* | 11/2018 | Adachi | G06V 20/52 |
| 2019/0043207 A1* | 2/2019 | Carranza | G06V 20/52 |
| 2020/0359456 A1* | 11/2020 | Suzuki | H04W 88/06 |
| 2021/0256711 A1* | 8/2021 | Yachida | H04N 23/61 |
| 2021/0286981 A1* | 9/2021 | Fujii | H04N 23/69 |
| 2022/0345619 A1* | 10/2022 | Kato | G06V 20/52 |
| 2024/0022806 A1* | 1/2024 | Kudo | H04N 23/695 |
| 2024/0296694 A1* | 9/2024 | Proschowsky | H04N 7/147 |

* cited by examiner

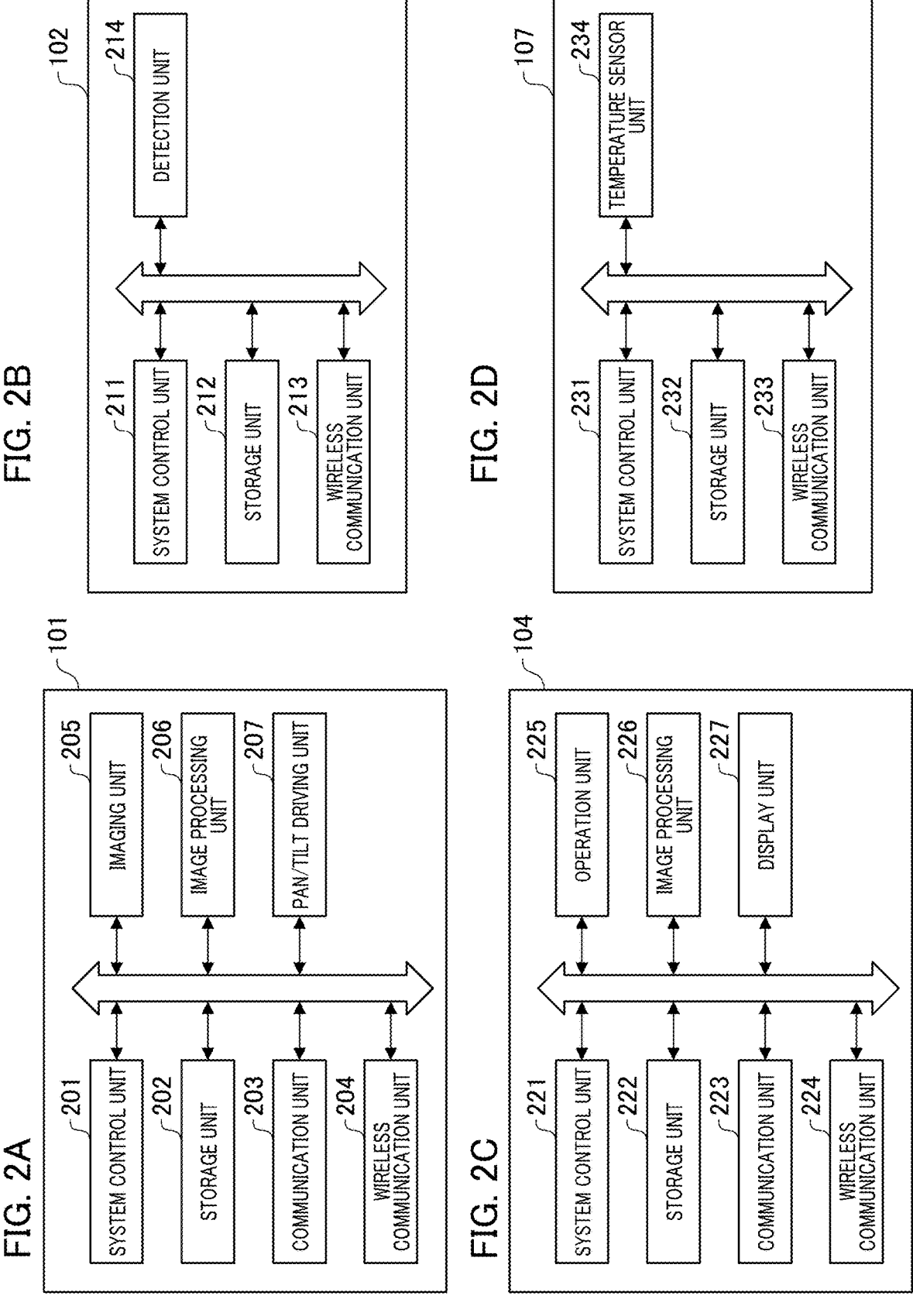

201 SYSTEM CONTROL UNIT
202 STORAGE UNIT
203 COMMUNICATION UNIT
204 WIRELESS COMMUNICATION UNIT

205 IMAGING UNIT
206 IMAGE PROCESSING UNIT
207 PAN/TILT DRIVING UNIT

211 SYSTEM CONTROL UNIT
212 STORAGE UNIT
213 WIRELESS COMMUNICATION UNIT

214 DETECTION UNIT

221 SYSTEM CONTROL UNIT
222 STORAGE UNIT
223 COMMUNICATION UNIT
224 WIRELESS COMMUNICATION UNIT

225 OPERATION UNIT
226 IMAGE PROCESSING UNIT
227 DISPLAY UNIT

231 SYSTEM CONTROL UNIT
232 STORAGE UNIT
233 WIRELESS COMMUNICATION UNIT

234 TEMPERATURE SENSOR UNIT

Figures 3A, 3B, 3C:
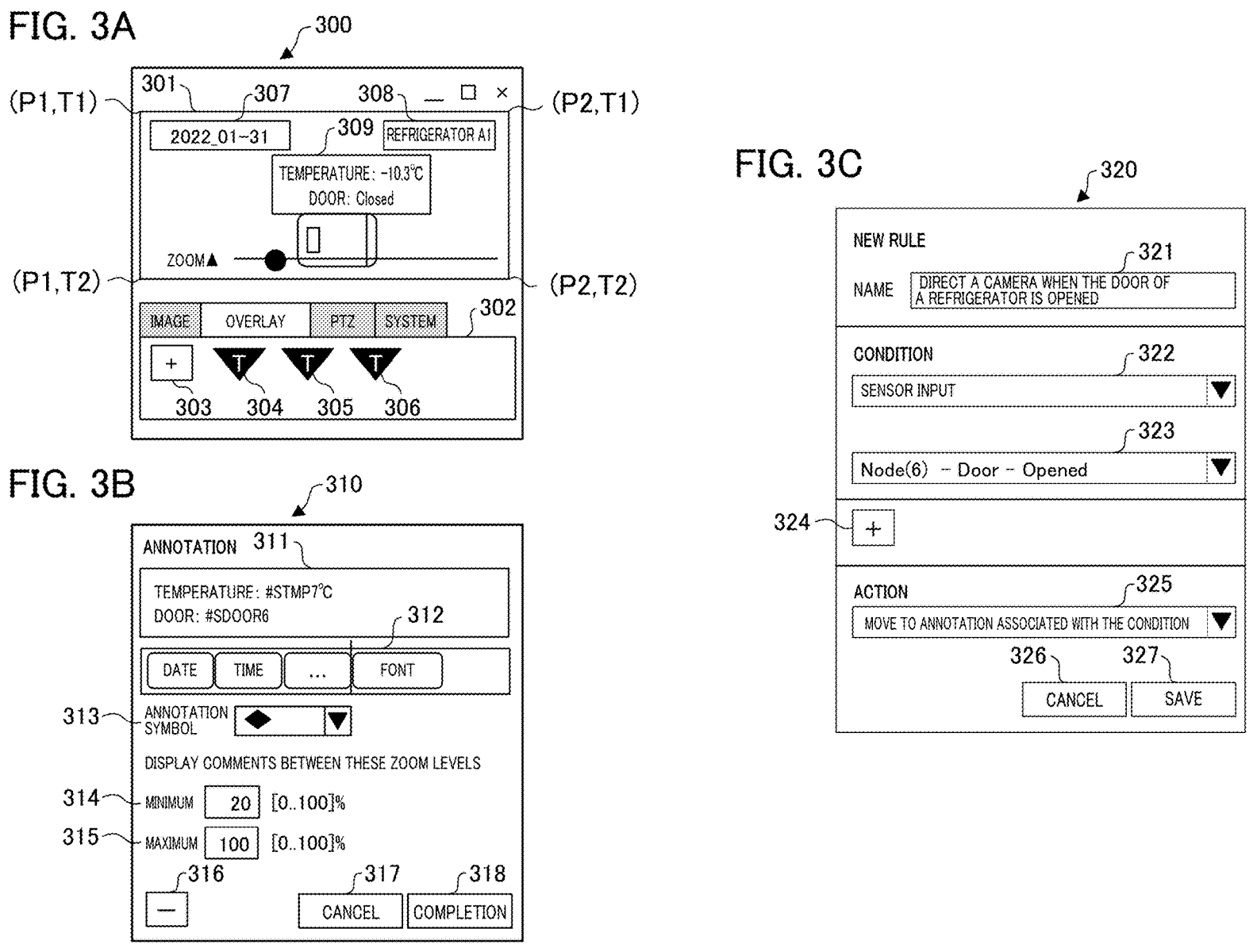

NEW RULE

NAME    321
DIRECT A CAMERA WHEN THE DOOR OF
A REFRIGERATOR IS OPENED

CONDITION    322
SENSOR INPUT    ▶

Node(6) -- Door -- Opened    ▶    323

324    +

ACTION    325
MOVE TO ANNOTATION ASSOCIATED WITH THE CONDITION    ▶

326 CANCEL    327 SAVE

301    307    308 — □ ×
2022_01_31    309 REFRIGERATOR A1

TEMPERATURE: -10.3°C
DOOR: Closed (P2,T1)

302

(P2,T2)

ZOOM ▲

IMAGE    OVERLAY    PTZ    SYSTEM

ANNOTATION    311
TEMPERATURE: #STMP7°C
DOOR: #SDOOR6    312

DATE    TIME    ...    ▶    FONT

ANNOTATION
SYMBOL    313    ◆

DISPLAY COMMENTS BETWEEN THESE ZOOM LEVELS

MINIMUM    314    20    [0..100]%
MAXIMUM    315    100    [0..100]%

316    —    317 CANCEL    318 COMPLETION

| ID | ANNOTATION TEXT | PTZ VALUE (Pan, Tilt, Zoom) | ICON ID | MINIMUM ZOOM LEVEL | MAXIMUM ZOOM LEVEL |
|----|-----------------|----------------------------|---------|--------------------|--------------------|
| | 401 | 402 | 403 | 404 | 405 | 406 |
| 1 | #DATE | 0, 0, 30 | 0 | 0 | 100 |
| 2 | REFRIGERATOR A1 | 90, 0, 30 | 1 | 0 | 100 |
| 3 | TEMPERATURE : #STMP7°C DOOR : #SDOOR6 | 45, 45, 30 | 2 | 20 | 100 |
| : | : | : | : | : | : |

| ID | RULE NAME | CONDITION | ACTION |
|----|-----------|-----------|--------|
| | 411 | 412 | 413 | 414 |
| 1 | DIRECT CAMERA WHEN DOOR OF REFRIGERATOR IS OPENED | SENSOR INPUT – Node(6) – Door – Opened | 10 |
| 2 | VIDEO RECORDING WHEN DOOR OF REFRIGERATOR IS OPENED | SENSOR INPUT – Node(6) – Door – Opened | 1 |
| : | : | : | : |

FIG. 6A

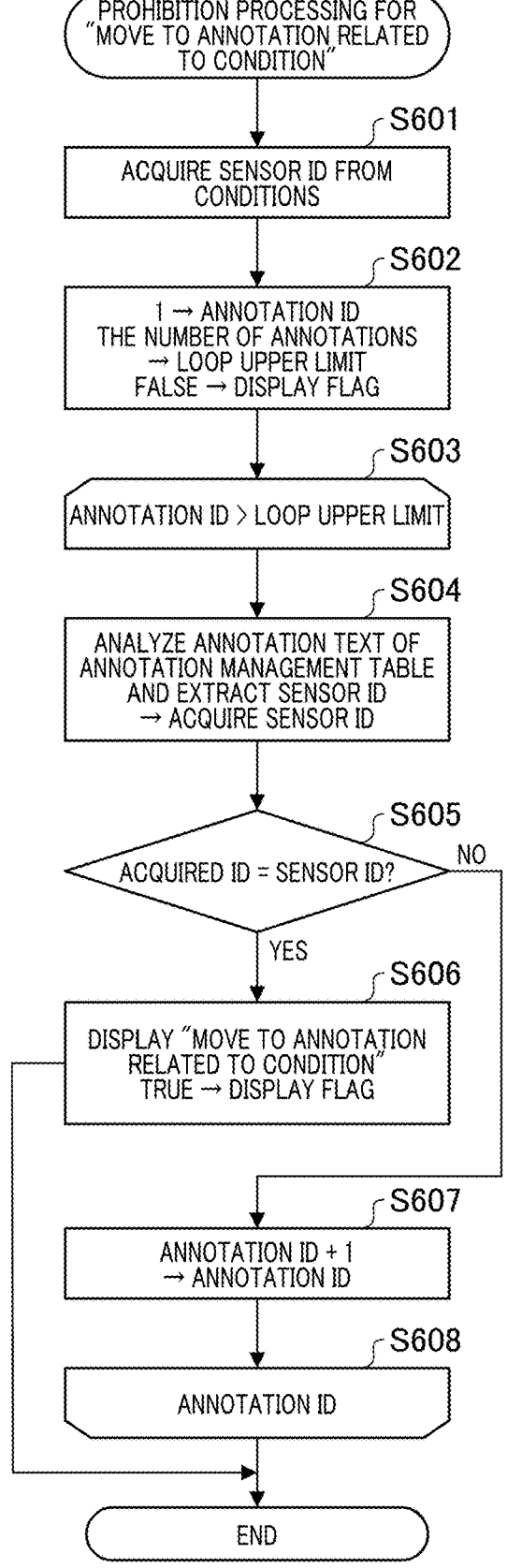

PROHIBITION PROCESSING FOR "MOVE TO ANNOTATION RELATED TO CONDITION"

S601
ACQUIRE SENSOR ID FROM CONDITIONS

S602
1 → ANNOTATION ID
THE NUMBER OF ANNOTATIONS → LOOP UPPER LIMIT
FALSE → DISPLAY FLAG

S603
ANNOTATION ID > LOOP UPPER LIMIT

S604
ANALYZE ANNOTATION TEXT OF ANNOTATION MANAGEMENT TABLE AND EXTRACT SENSOR ID → ACQUIRE SENSOR ID

S605
ACQUIRED ID = SENSOR ID?     NO

YES
S606
DISPLAY "MOVE TO ANNOTATION RELATED TO CONDITION"
TRUE → DISPLAY FLAG

S607
ANNOTATION ID + 1 → ANNOTATION ID

S608
ANNOTATION ID

END

FIG. 6B

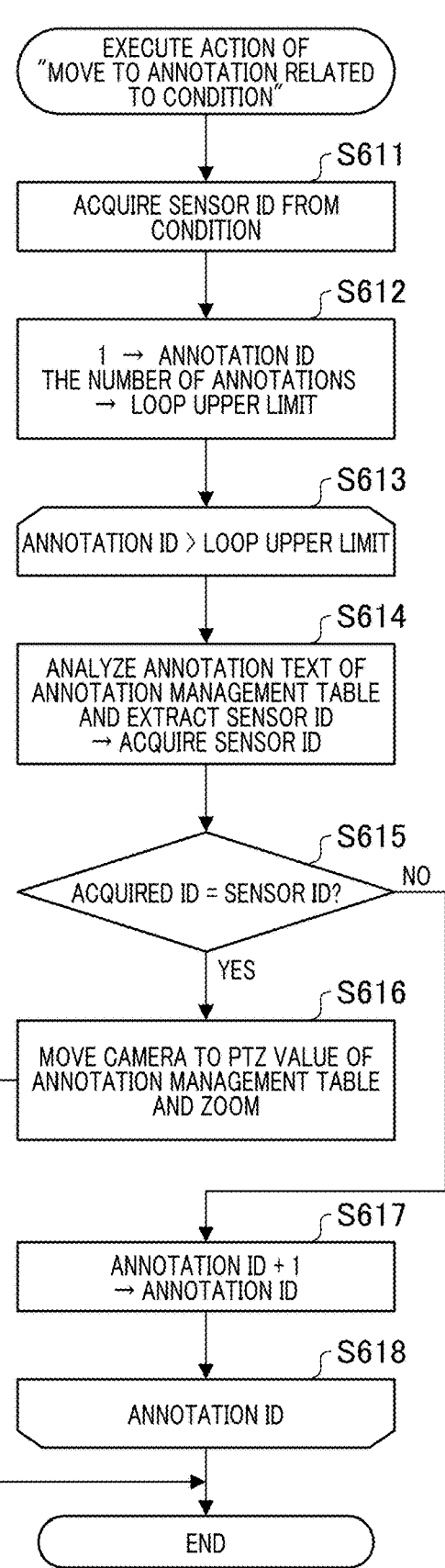

EXECUTE ACTION OF "MOVE TO ANNOTATION RELATED TO CONDITION"

S611
ACQUIRE SENSOR ID FROM CONDITION

S612
1 → ANNOTATION ID
THE NUMBER OF ANNOTATIONS → LOOP UPPER LIMIT

S613
ANNOTATION ID > LOOP UPPER LIMIT

S614
ANALYZE ANNOTATION TEXT OF ANNOTATION MANAGEMENT TABLE AND EXTRACT SENSOR ID → ACQUIRE SENSOR ID

S615
ACQUIRED ID = SENSOR ID?     NO

YES
S616
MOVE CAMERA TO PTZ VALUE OF ANNOTATION MANAGEMENT TABLE AND ZOOM

S617
ANNOTATION ID + 1 → ANNOTATION ID

S618
ANNOTATION ID

END

INFORMATION PROCESSING APPARATUS THAT CONTROLS A CAMERA OF A COMMUNICATION DEVICE IF AN ASSOCIATED ANNOTATION EXISTS IN A MANAGEMENT TABLE, INFORMATION PROCESSING METHOD, AND STORAGE MEDIUM

BACKGROUND OF THE INVENTION

Field of the Invention

The present invention relates to an information processing apparatus, an information processing method, a storage medium, and the like.

Description of the Related Art

In the case in which the network camera is a PTZ (pan-tilt-zoom) camera, operation is performed by registering several places to be viewed (preset positions) in advance and having them displayed in a cyclic manner so that a single camera can monitor a wide area.

Additionally, there is a case in which a food-manufacturing and selling company records temperature information of a refrigerator and a camera image for food sanitation and verification, and for example, based on a record, the food-manufacturing and selling company verifies whether or not a management procedure of a worker is appropriate based on a temperature change at the time of opening and closing a door and video recording. There is a technology in which a PTZ camera and a door open/closed sensor are used so that when the door is opened, the camera is directed toward the refrigerator and an image is recorded.

In addition, for example, in a network camera or video management software (VMS), an annotation text can be embedded in an image and displayed as a kind of overlay function.

Setting can be performed, for example, such that temperature information of a refrigerator with a sensor function is superimposed and displayed on the refrigerator on a live view as an annotation. The annotation displayed on the live view can be moved to a target position by being dragged and dropped.

In contrast, as a communication standard of a wireless network that collects sensor data from a sensor device having a sensor function, there is a standard referred to as "Z-Wave (registered trademark)". In such a wireless network, a sensor device (subsidiary unit) having a sensor function transmits a notification to a network camera (master device) that collects sensor data according to conditions set in advance.

In the master unit and the VMS, there is a system in which cooperative operation with the master unit and another subsidiary unit can be set using a notification received from the subsidiary unit as a trigger. It is possible to perform settings, for example, such that a camera is directed to a predetermined position when the master unit receives a notification about door opening from a subsidiary unit with a sensor function for door open/closed detection.

For example, Japanese Patent Laid-Open No. 2018-26672 discloses a communication device that, upon detecting a wireless signal from a subsidiary unit having a sensor function, directs a camera to a transmission source calculated based on beacon information and the like of the subsidiary unit.

However, in the configuration of Japanese Patent Application Laid-Open No. 2018-26672, the setup effort is required to display the annotation of the temperature information on the refrigerator on the live view and perform recording by directing the camera to the annotation when the door is opened. It is time-consuming, for example, to create an annotation that shows a temperature of the refrigerator and a door open/closed state, and then it is necessary to register a preset position after placing it on the live view.

Additionally, because a plurality of preset positions are registered under the operation of the cyclic display, it is time-consuming to search a preset position associated with the annotation when making the setting to direct the camera to the annotation is performed.

In addition, in the configuration disclosed in Japanese Patent Application Laid-Open No. 2018-26672, if a communication device having a sensor function is not equipped with a beacon and the like, and cannot specify a transmission source, it is time-consuming to manually register a preset position and necessary to search for a preset position that is associated with the annotation. As described above, in the configuration disclosed in Japanese Patent Application Laid-Open No. 2018-26672, there is a drawback in which it is time-consuming to set up.

SUMMARY OF THE INVENTION

An information processing apparatus capable of communicating with a communication device according to one aspect of the present invention, comprising: at least one processor or circuit configured to function as: a receiving unit; and a control unit configured to, in a case in which the receiving unit receives a notification satisfying a predetermined condition from the communication device, search for an annotation related to the condition from a predetermined annotation management table, and direct a camera to the annotation that matches, wherein the control unit executes a predetermined operation based on a rule set in advance in a case in which the camera is directed to the annotation.

Further features of the present invention will become apparent from the following description of embodiments with reference to the attached drawings.

BRIEF DESCRIPTION OF THE DRAWINGS

FIGS. 2A to 2D are functional block diagrams showing an example of a configuration of each of communication device according to the first embodiment of the present invention.

FIGS. 3A to 3C are diagrams illustrating examples of screens in the first embodiment.

FIGS. 4A and 4B are figures that illustrate management tables in the first embodiment.

FIG. 6A is a flowchart for explaining the prohibition processing of an action rule setting screen 320 in the network camera 101 according to the first embodiment. FIG. 6B is a flowchart for explaining the processing for directing the camera to the annotation related to a condition in the network camera 101 according to the first embodiment.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

Figure 1:
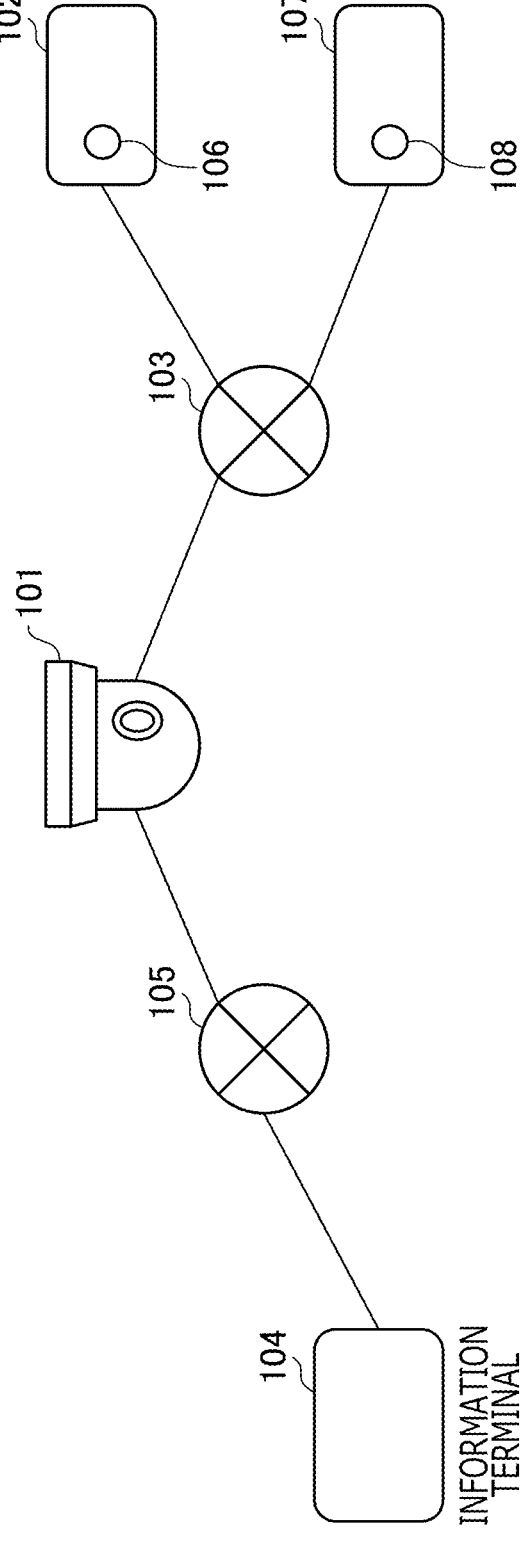
FIG. 1 is a diagram showing a configuration example of a communication system using a network camera 101 according to the first embodiment of the present invention.

FIG. 1 is a diagram showing a configuration example of a communication system using the network camera 101 according to the first embodiment of the present invention.

The communication system as shown in FIG. 1 is configured by including the network camera 101 serving as an information processing apparatus, sensor devices 102 and 107 serving as communication devices, and an information terminal 104 serving as a communication control device. The network camera 101 serving as an information processing apparatus is configured to enable communication with the communication devices.

The network camera 101 can communicate with the sensor devices 102 and 107 via a network 103. Additionally, the network camera 101 can communicate with the information terminal 104 via a network 105.

The sensor device 102 has a pairing button 106 for establishing communication with the network camera 101. The sensor device 107 has a pairing button 108 for establishing communication with the network camera 101. The sensor devices 102 and 107 may be one or more sensor devices.

The network camera 101 serving as an information processing apparatus includes a camera having an image capturing function, and can distribute captured images and videos to the information terminal 104 via the wired or wireless network 105.

Additionally, at least one of the imaging operation, direction control such as angle of view and pan or tilt of the network camera 101, and video recording control can be controlled by using the information terminal 104 communicating with the network camera 101 via the wired or wireless network 105. Furthermore, settings related to communication with the network camera 101 can also be performed.

The sensor devices 102 and 107 are sensors capable of detecting at least one of predetermined states of an object such as a concentration of gas such as smoke and carbon monoxide, a temperature, and the door opening and closing, and transmit a notification to the network camera 101 according to a preset condition.

That is, the sensor devices 102 and 107 can also provide notification that the temperature exceeds a predetermined criterion, a predetermined operation (open and closed) of a predetermined object including a door and the like, in addition to the sensor information such as a temperature. Alternatively, the sensor devices 102 and 107 can also provide notification about the timing of replacement and the like due to, for example, performance deterioration of the sensor device.

In the first embodiment, it is assumed that the sensor device 102 is a sensor capable of detecting the opening and closing of door, and the sensor device 107 is a sensor capable of measuring a temperature. For example, the sensor device 102 is mounted on the door of a refrigerator to detect the opening and closing of the door of the refrigerator. The sensor device 107 is disposed in the refrigerator to monitor the temperature in the refrigerator.

In the first embodiment, the network camera 101 can embed an annotation text in an image and display the image as a kind of overlay function. Setting can be performed, for example, such that temperature information acquired from the sensor device 107 and the door open/closed state acquired from the sensor device 102 are displayed superimposed on the video as annotations.

Additionally, the annotation can be moved by dragging the annotation on the video image. The annotation includes PTZ coordinate information, and is displayed in the case in which the PTZ coordinates of the annotation are included in the angle of view. The network camera 101 assigns IDs to each of the annotations to be managed, and manages the annotation information in association with the ID.

Note that the PTZ coordinates in the first embodiment are coordinates with which the direction and the angle of view of the camera can be specified by panning, tilting, and zooming, and an object existing at the PTZ coordinates can be included in the imaging angle of view by panning, tilting, and zooming the camera toward the PTZ coordinates.

In the first embodiment, for example, the annotation about the temperature information in the refrigerator and the open/closed state of the door of the refrigerator is placed at the PTZ coordinates superimposed on the refrigerator. That is, the annotation is stored in association with the PTZ coordinates of the refrigerator. Accordingly, when the camera is directed to the PTZ coordinates of the refrigerator, the annotation thereof is displayed at the position of the refrigerator on the screen.

When the network camera 101 receives information indicating that a predetermined condition is satisfied (for example, detection by the sensor device 102) from the communication devices such as the sensor device 102, the information processing apparatus, for example, the network camera 101 performs a predetermined operation (predetermined control).

Here, the predetermined operation (predetermined control) includes control of the network camera 101. Additionally, the control of the network camera 101 includes at least one of, for example, an image capturing operation of the camera, direction control of the camera, angle-of-view control (zoom control) of the camera, and video recording control of the camera.

The network camera 101 manages each predetermined notification and operation as an action rule, assigns IDs to each action rule, and manages action rule information in association with the ID.

In the first embodiment, in a case in which the sensor device 102 detects that the door of the refrigerator has been opened, setting can be performed such that the network camera 101 is directed to predetermined PTZ coordinates (for example, a direction of an annotation superimposed on the refrigerator) via the network 103.

For example, upon receiving a notification that satisfies a predetermined condition from the sensor device 102 serving as a communication device, the network camera 101 can search for an annotation related to the sensor device serving as a notification source, and can direct the camera toward PTZ coordinates included in the annotation.

That is, when a notification that satisfies a predetermined condition is received from the communication device, an annotation related to the above condition is searched from a predetermined annotation management table, and the camera is directed to the matched annotation. Details of specific control will be described below with reference to FIG. 5 and FIG. 6.

The annotation and the action rules can be set by an operator using the information terminal 104 that can communicate with the network camera 101 via the network 105.

Alternatively, it can be set by the operator using another information terminal (not illustrated) that can communicate via the network 103.

Alternatively, it can be set by the operator using another information terminal (not illustrated) that directly performs wireless communication with the sensor device 102 not via the network camera 101.

The network 103 is a wireless communication network using a wireless communication method compliant with the Z-Wave standard. In this case, the sensor device 102 can execute the notification to the network camera 101 by using a profile defined by the Z-Wave standard.

Note that the network 103 may be a wireless communication network using a wireless communication method compliant with the Wi-Fi Aware standard (Wi-Fi NAN standard) and the ZigBee (register trade mark) standard, instead of the Z-Wave standard. That is, the communication device and the information processor according to the first embodiment communicate using a wireless communication method network compliant with at least one of the Z-Wave standards, the Wi-Fi Aware standard, and the ZigBee standard.

The network 103 may be a wired or wireless network as long as the sensor device 102 can communicate with another device including the network camera 101 according to a preset condition.

The network 105 may be a wired communication network compliant with a wired communication method such as a wired LAN, or may be a wireless communication network compliant with a wireless communication method such as IEEE802.11 series standards.

In this case, the network camera 101 may operate as an access point that constructs the network 105, or may operate as a station that participates in the network 105 constructed by the information terminal 104 or an access point (not illustrated).

The network 105 may be a network compliant with the wireless communication method, for example, the Wi-Fi Direct standard and the Wi-Fi Aware standard (Wi-Fi NAN standard).

Alternatively, the network 105 may be a network compliant with the wireless communication method such as Bluetooth (registered trademark), NFC, UWB, MBOA, Zig-Bee, and Z-Wave, instead of the IEEE802.11 series standard.

Note that NAN is an abbreviation of "Neighbor Awareness Networking", NFC is an abbreviation of "Near Field Communication". Additionally, UWB is an abbreviation of "Ultra Wide Band".

MBOA is an abbreviation of "Multi Band OFDM (Orthogonal Frequency Division Multiplexing) Alliance". UWB includes wireless USB, wireless 1394, WiNET, and the like.

FIGS. 2A to 2D are functional block diagrams showing configuration examples of each communication device according to the first embodiment of the present invention. FIG. 2A is a functional block diagram showing the configuration of the network camera 101 according to the first embodiment, and FIG. 2B is a functional block diagram showing the configuration of the sensor device 102 according to the first embodiment.

FIG. 2C is a functional block diagram showing a configuration example of the information terminal 104 according to the first embodiment. FIG. 2D is a functional block diagram showing a configuration example of the sensor device 107 according to the first embodiment.

Note that some of the functional blocks as shown in FIG. 2 are realized by causing a CPU serving as a computer included in system control units 201, 211, 221, 231, and the like to execute a computer program stored in a memory serving as a storage medium.

However, some or all of these may be realized by hardware. As the hardware, a dedicated circuit (ASIC), a processor (reconfigurable processor, DSP), and the like can be used. Additionally, each of functional blocks as shown in FIG. 2 may not be incorporated in the same housing, and may be configured by separate devices that are connected to each other via a signal path.

As shown in FIG. 2A, the network camera 101 is configured by the system control unit 201, a storage unit 202, a communication unit 203, a wireless communication unit 204, an image capturing unit 205, an image processing unit 206, a pan/tilt driving unit 207, and the like.

A system control unit 201 is configured by one or more processors such as a CPU and an MPU serving as a computer, and controls the entire network camera 101 by executing a computer program stored in the storage unit 202 to be described below. Note that the system control unit 201 may control the entire network camera 101 in cooperation with the computer program stored in the storage unit 202 and an operating system (OS).

Note that the CPU is an abbreviation of Central Processing Unit, and the MPU is an abbreviation of Micro Processing Unit. Additionally, the system control unit 201 may include a plurality of processors such as a multi-core processor, and the plurality of processors may control the entire network camera 101.

The system control unit 201 analyzes a command transmitted to the network camera 101, and performs processing corresponding to the command. For example, the system control unit 201 receives the command corresponding to an instruction input by an operator (user) via the information terminal 104 from the information terminal 104, and can execute processing based on the received command.

Additionally, the system control unit 201 detects a change in an internal parameter held by the network camera 101, and performs processing using the detection result as an event trigger. For example, in the case in which information indicating the state of the sensor device 102, which is held by the network camera 101, is changed, processing corresponding to the detection of the change can be executed.

The storage unit 202 is configured by one or more memories such as a ROM and a RAM, and stores a computer program for performing various operations and various types of information such as communication parameters for wireless communication. ROM is an abbreviation of "Read Only Memory" and RAM is an abbreviation of "Random Access Memory".

Note that the storage unit 202 may include at least one storage medium such as a flexible disk, a hard disk, an optical disk, a magneto-optical disk, a CD-ROM, a CD-R, a magnetic tape, a nonvolatile memory card, and a DVD, in addition to a memory, for example, a ROM and a RAM.

The storage unit 202 stores setting values such as parameters for image quality adjustment and network settings, so that the values previously set can be used even when the network camera 101 is restarted. Additionally, the storage unit 202 stores communication information regarding communication with the sensor device 102, which is a subsidiary device, sensor information acquired from the sensor devices 102 and 107, an annotation management table 400 and an action rule management table 410 which will be described below with reference to FIG. 4.

The communication unit 203 performs control of communication via a wired LAN or a wireless LAN. Specifically, the communication unit 203 performs control of communication via the network 105. The wireless communication unit 204 performs control of communication via the network 103 compliant with the Z-Wave standard.

Note that although, in the first embodiment, the network camera 101 has the communication unit 203 and the wireless communication unit 204 separately, communication via the network 105 and communication via the network 103 may be performed by one communication unit.

The image capturing unit 205 is configured by a lens and an image sensor such as a CMOS image sensor, and the image capturing element photoelectrically converts an optical image formed by the lens and outputs the optical image as an image capturing signal. The image processing unit 206 performs image processing and compression coding processing on the image capturing signal that has been output from the image capturing unit 205 to generate image data and video data. The pan/tilt driving unit 207 can control at least one of panning, tilting, and zooming of the camera by the system control unit 201.

In FIG. 2B, the sensor device 102 is configured by a system control unit 211, a storage unit 212, a wireless communication unit 213, a detection unit 214, and the like. The system control unit 211 is configured by one or more processors such as a CPU and a MPU serving as a computer, and controls the entire sensor device 102 by executing a computer program stored in the storage unit 212 to be described below.

The storage unit 212 is configured by one or more memories such as a ROM and a RAM, and stores a computer program for performing various operations and various types of information such as communication parameters for wireless communication. In addition, the storage unit 212 stores communication information related to communication with the network camera 101 serving as the master unit.

The wireless communication unit 213 performs control of communication via the network 103 in conformity with the Z-Wave standard. The detection unit 214 outputs a detection signal as a detection result when, for example, door open and close is detected by the sensor function. Note that although, in the first embodiment, an example in which the sensor device 102 has only the detection unit 214 has been described, the sensor device 200 may have one or more detection units.

In FIG. 2C, the information terminal 104 is configured by the system control unit 221, a storage unit 222, a communication unit 223, a wireless communication unit 224, an operation unit 225, an image processing unit 226, a display unit 227, and the like.

The system control unit 221 is configured by one or more processors such as a CPU and an MPU serving as a computer, and controls the information terminal 104, the network camera 101, and the sensor device 102 by executing a computer program stored in the storage unit 222. The storage unit 222 may have the same configuration as that of the storage unit 202.

The communication unit 223 performs control of communication via the network 105 by a wired LAN or wireless LAN. As shown in FIG. 2C, the wireless communication unit 224 may further be provided to perform control of communication via the network 103 in conformity with the Z-Wave standard.

Note that although, in the first embodiment, the information terminal 104 has the communication unit 223 and the wireless communication unit 224 separately, communication by one communication unit via the network 105 may be performed.

The operation unit 225 is for inputting user operations through a mouse, a keyboard, a touch panel, and the like. The image processing unit 226 processes image data and video data to generate a display signal and the like for display.

The display unit 227 includes a display device, for example, a liquid crystal display (LCD) for displaying image data and video data, and displays a screen, as shown, for example, in FIG. 3.

Note that an operator (user) of the information terminal 104 can set an annotation and an action rule in a state in which a screen as shown in FIG. 3 is displayed on the display unit 227. The system control unit 221 in the information terminal 104 performs the above-described control.

In FIG. 2D, the sensor device 107 is configured by a system control unit 231, a storage unit 232, a wireless communication unit 233, a temperature sensor unit 234, and the like. The system control unit 231, the storage unit 232, and the wireless communication unit 233 are the same as those of the sensor device 102, and thus the description thereof will be omitted.

The temperature sensor unit 234 measures, for example, a temperature by a sensor function. The system control unit 231 provides a notification about the measurement result to the network camera 101 via the wireless communication unit 233. Note that although, in the first embodiment, the example in which the sensor device 107 has only the temperature sensor unit 234 has been described, the sensor device 200 may have one or more temperature sensor units or detection units.

FIGS. 3A to 3C are diagrams illustrating screen examples in the first embodiment, and FIGS. 3A and 3B are diagrams illustrating screen examples for setting an annotation in the information terminal 104 for the master device (network camera 101).

FIG. 3A is a diagram illustrating an overlay management screen 300 that creates and displays an annotation 309 including the information on the sensor devices 102 and 107. FIG. 3B is a diagram showing an annotation setting screen 310 for setting an annotation.

Note that, in FIG. 3A, it is assumed that the network camera 101 and the sensor devices 102 and 107 have been paired in advance. The overlay management screen 300 in FIG. 3A is displayed on the display unit 227 of the information terminal 104 when the information terminal 104 transmits an overlay management screen display request to the system control unit 201 of the network camera 101.

A live view 301 for displaying annotations superimposed on the video, an overlay setting tab 302, an add button 303 for adding an annotation, and annotation icons 304, 305, and 306 indicating created annotations are displayed on the overlay management screen 300. Annotation 307 is an annotation corresponding to the annotation icon 304 and including information on current date and time of the camera.

In the first embodiment, "2022-01-31" (i.e., Jan. 31, 2022) is displayed. Annotation 308 corresponds to the annotation icon 305, and is an annotation including the text of name of the refrigerator to be monitored. In the first embodiment, "Refrigerator A1" is displayed as the name of refrigerator.

The annotation 309 corresponds to the annotation icon 306, and is an annotation including the temperature acquired from the sensor device 107 and the door open/closed state acquired from the sensor device 102. In the first embodiment, the temperature is displayed as "temperature: −10.3°

C." in degrees Celsius (° C.), and the door open/closed state is displayed as "Open, Closed". In FIG. 3A, "Door: Closed" is displayed.

In the first embodiment, the system control unit 201 determines that the annotation is included in the angle of view of the live view 301 when the coordinates of the annotation are included in a range of (Pan, Tilt) coordinates= (P1, T1), (P1, T2), (P2, T1), and (P2, T2) as shown in FIG. 3A.

If it is determined that the coordinates of the created annotation are included in the angle of view of the live view 301, the annotations 307, 308, and 309 are displayed superimposed on the video of the live view 301. When the system control unit 201 detects that the add button 303 has been clicked, the annotation setting screen 310 as shown in FIG. 3B is displayed on the information terminal 104.

As shown in FIG. 3B, in the first embodiment, for example, the zoom magnification of the network camera 101 in the live view 301 can be controlled.

FIG. 3B illustrates an example of the annotation setting screen 310 when the annotation 309 has been set. A text box 311 for inputting modifiers for displaying a text indicating the annotation, a door open/closed state of the sensor device 102, a temperature of the sensor device 107, and the like, and a modifier list 312 for displaying and selecting a modifier set in advance are displayed on the annotation setting screen 310.

Additionally, an annotation symbol selection section 313 for selecting an annotation symbol to be displayed when the display target is out of the zoom level range, a minimum zoom level 314 and a maximum zoom level 315 of the display target zoom level, and a delete button 316 for deleting annotation are displayed on the annotation setting screen 310. Thus, in the first embodiment, it is possible to specify the zoom level that defines the display range of the annotation, in addition to the PTZ coordinates of the annotation.

Further, a cancel button 317 for canceling the setting of the annotation, and a completion button 318 for saving the setting of the annotation are displayed on the annotation setting screen 310. Here, the modifier in the first embodiment will be explained. The modifier for displaying the temperature of the sensor device 107 is defined as #STMPn, and a sensor ID identifying the sensor device 107 is input to n.

For example, when "#STMP7° C." is written in the text box 311, temperature information (for example, −10.3) of the sensor devices with sensor IDs=7 is displayed in the form of a text "−10.3° C." in the live view 301 shown as the annotation 309.

The modifier for displaying the door open/closed state of the sensor device 102 is defined as #SDOORn, and a sensor ID identifying the sensor device 102 is input to n. For example, when #SDOOR6 is written in the text box 311, the door open/closed state (for example: Closed) of the sensor devices with sensor ID=6 is displayed in the live view 301 with the text "Closed" as shown as the annotations 309. Note that, in the Z-Wave standard, the sensor ID means a node ID.

A modifier for displaying the information on date and time of the network camera 101 is defined as #DATE. For example, when #DATE is written in the text box 311, the information on date and time of the network camera is displayed in the live view 301 with the text 2022_01-31 as shown as the annotation 307.

The annotation symbol selection section 313 is a selection section that selects annotation symbols. A corresponding ID is assigned to the annotation symbol, and the system control unit 201 can identify the annotation symbol. The zoom level at which the text and modifiers input in the text box 311 are displayed is defined to be higher than or equal to the value displayed at the minimum zoom level 314 and less than or equal to the value displayed at the maximum zoom level 315.

The delete button 316 is a button for deleting an annotation icon displayed on the overlay management screen 300. For example, when the delete button 316 is clicked on the annotation setting screen 310 corresponding to the annotation icon 304 in FIG. 3A, the system control unit 201 closes the annotation setting screen 310, and deletes the annotation icon 304 and the annotation 307. Subsequently, the transition to the overlay management screen 300 is performed.

The cancel button 317 is a button for interrupting the annotation setting screen 310. For example, when the cancel button 317 is clicked, the system control unit 201 closes the annotation setting screen 310 and transitions to the overlay management screen 300 is performed. The completion button 318 is a button for storing the setting content input to the annotation setting screen 310 in the annotation management table 400 in FIG. 4A.

FIG. 3C is a diagram showing the action rule setting screen 320 for setting an action rule in the information terminal 104 for the master device (network camera 101). A name input section 321 for inputting a rule name, a condition selection section 322, a notification selection section 323, a condition addition button 324, an action selection section 325, a cancel button 326, and a save button 327 are displayed on the action rule setting screen 320.

The condition selection section 322 is a selection section for selecting a predetermined condition to be a trigger. The notification selection section 323 is a setting item displayed when "sensor input" is selected in the condition selection section 322, and is a selection section for selecting a notification type of the sensor devices 102 and 107 to be used as a trigger. The condition addition button 324 is a button for additionally inputting the condition selection section 322 when a plurality of conditions is defined.

The action selection section 325 is a selection section that selects a predetermined operation to be executed when the predetermined condition selected by the condition selection section 322 is satisfied. A cancel button 326 is a button for interrupting the action rule setting. A save button 327 is a button for saving the setting content input to the action rule setting screen 320 in the action rule management table 410 in FIG. 4B, which is explained below.

FIGS. 4A and 4B are diagrams showing management tables in the first embodiment, and show examples of management tables for managing annotations and action rules. FIG. 4A is a diagram showing the annotation management table 400 for managing created annotations. FIG. 4B is a diagram showing an action rule management table for managing created action rules.

The annotation management table 400 in FIG. 4A is a table for managing the created annotation settings, and has a total of six columns: ID 401, an annotation text 402, a PTZ value 403, an icon ID 404, minimum zoom level 405, and maximum zoom level 406. In FIG. 4A, an example in which the settings of the annotations 307, 308, and 309 are stored is shown.

Identification IDs assigned when an annotation is newly created is stored in the column of "ID 401". For example, the identification IDs are stored when the completion button 318 is clicked on the annotation setting screen 310 in FIG. 3B. Texts in the text box 311 are stored in the column of annotation text 402. For example, when the completion button 318 is clicked on the annotation setting screen 310, the texts in the text box 311 are stored.

PTZ coordinate values of the annotation placed on the live view 301 are stored in the column of the PTZ value 403. When the completion button 318 is clicked on the annotation setting screen 310 or when the movement of the annotation is completed on the live view 301, the PTZ coordinate values of the annotation at that time are stored. That is, the annotation management table 400 includes coordinate information associated with the annotation.

The identification ID of the annotation symbols selected by the annotation symbol selection section 313 is stored in the column of the icon ID 404. For example, when the completion button 318 is clicked on the annotation setting screen 310, the identification ID corresponding to the selected annotation symbol is stored.

The minimum zoom level 314 that defines the display range of the annotation symbol is stored in the column of the minimum zoom level 405. Additionally, the maximum zoom level 315 that defines the display range of the annotation symbol is stored in the column of the maximum zoom level 406.

For example, the minimum zoom level 314 and the maximum zoom level 315 input when the completion button 318 is clicked in the annotation setting screen 310 are stored.

The action rule management table 410 in FIG. 4B is a table for managing the created action rule settings, and has a total of four columns of an ID 411, a rule name 412, a condition 413, and an action 414.

The identification ID assigned when an action rule is newly created is stored in the column of the ID 411. For example, the identification ID is stored when the save button 327 is clicked on the action rule setting screen 320.

The texts of the name input section 321 are stored in the column of the rule name 412. For example, when the save button 327 is clicked on the action rule setting screen 320, the text of the name input section 321 is stored.

In FIG. 4B, a rule of name of "direct the camera to the annotation when the refrigerator door opens" and a rule of name of "record when the refrigerator door opens" are stored.

Texts indicating a condition and the like selected by the condition selection section 322 and the notification selection section 323 in FIG. 3C are stored in the column of the condition 413. For example, when "sensor input" is selected by the condition selection section 322 and the notification type of the sensor device 102 "Node (6)—Door-Opened" is selected by the notification selection section 323, the text "sensor input-Node (6)—Door-Opened" is stored.

When a predetermined condition occurs, the system control unit 201 determines whether or not the condition is satisfied by comparing it to the text. When the condition addition button 324 is clicked, a storage region similar to that of the condition 413 is dynamically generated. Alternatively, a region for a condition that can be added in advance may be statically reserved.

An ID of a predetermined operation to be executed when a predetermined condition is satisfied is stored in the column of the action 414. For example, an ID for identifying an action when the save button 327 is clicked on the action rule setting screen 320 is stored. In the first embodiment, ID=1 is defined as "record video", and ID=10 is defined as "move to an annotation related to a condition".

Figure 5:
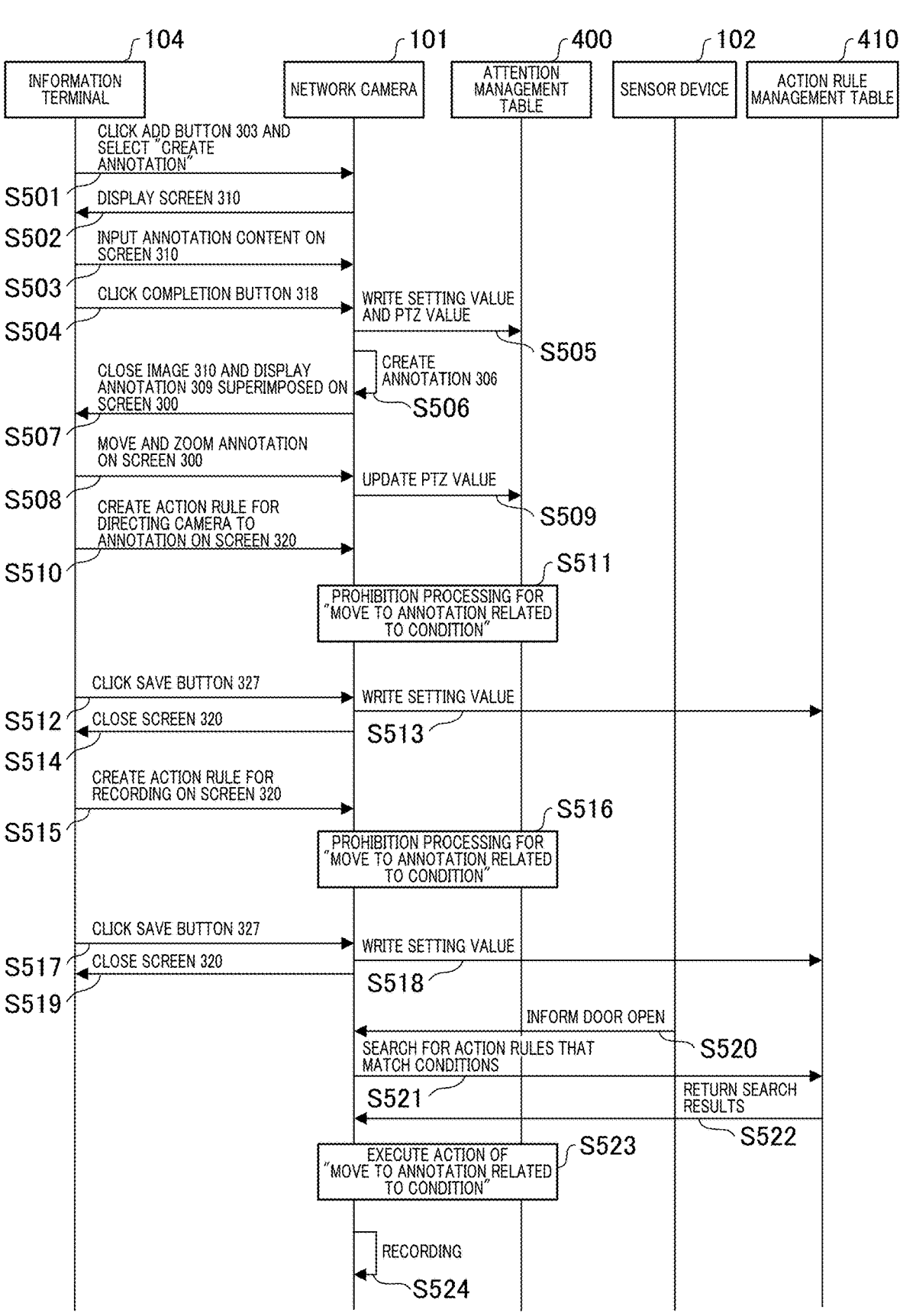
FIG. 5 is a flowchart illustrating an example of processes in the first embodiment.

FIG. 5 is a flowchart showing a processing example of the first embodiment, and is for explaining the annotation creation and action rule setting processing in the communication system of the first embodiment.

FIG. 6A is a flowchart for explaining the prohibition processing of the action rule setting screen 320 in the network camera 101 according to first embodiment. FIG. 6B is a flowchart for explaining the processing of directing the camera to the annotation related to the condition in the network camera 101 according to first embodiment.

The annotation creation and action rule setting processing in the first embodiment will be explained with reference to FIG. 5 and FIG. 6. Note that the operation of each step in FIG. 5 and FIG. 6 is performed by a computer in the system control unit 201, 211, 221, and the like executing a computer program stored in a memory.

Note that, in the annotation creation of the first embodiment in FIG. 5 and FIG. 6, an example in which an operator creates an annotation displaying the door open/closed state of the sensor device 102 and the temperature of the sensor device 107 will be explained.

Additionally, in the action rule setting processing in the first embodiment, when the master device receives the detection result that the door is opened from the subsidiary device, the master device searches for the annotation associated with the sensor ID of the subsidiary device from the annotation management table 400, and setting of directing the camera to the PTZ coordinates of the matched annotation is performed.

A specific operation example will be explained below. Note that the content and order of operations performed by the operator in the flowcharts of FIG. 5 and FIG. 6 are simply examples, and the present invention is not limited to these.

First, in step S501, the operator clicks the add button 303 on the overlay management screen 300 displayed on the information terminal 104 serving as the communication control device, and selects annotation creation on the displayed type selection screen. Then, the information terminal 104 transmits a display request for the annotation setting screen 310 to the network camera 101.

In step S502, when receiving the above instruction in step S501, the system control unit 201 displays the annotation setting screen 310 on the information terminal 104.

In step S503, the operator inputs annotation content to the annotation setting screen 310 displayed on the information terminal 104. In the first embodiment, the sensor ID=6 is assigned to the sensor device 102, the sensor ID=7 is assigned to the sensor device 107, and the operator inputs, for example, the text "temperature: #STMP7° C." displaying the temperature of the sensor device 107 to the text box 311.

Additionally, the operator inputs, for example, the text "door: #SDOOR6" displaying the door open/closed state of the sensor device 102 in the text box 311. Additionally, the operator selects the annotation symbol (ID=2) in the annotation symbol selection section 313, sets the minimum zoom level 314 to, for example, 20, and sets the maximum zoom level 315 to 100.

In step S504, the operator clicks the completion button 318 on the annotation setting screen 310 displayed on the information terminal 104. The information terminal 104 transmits a setting save instruction for the annotation setting screen 310 to the network camera 101.

In step S505, the system control unit 201 stores the PTZ coordinates and the setting content of the annotation setting screen 310 in the annotation management table 400. In the first embodiment, ID=3 is newly assigned, and the setting contents are stored in each of the items. As the PTZ coordinates of the annotation, the center coordinates of the live view 301 of the overlay management screen 300 are set as initial values.

In step S506, the system control unit 201 creates the annotation icon 306 of the overlay management screen 300 according to the setting content of the annotation management table 400.

In step S507, the system control unit 201 closes the annotation setting screen 310 and displays the overlay management screen 300 including the annotation icon 306 on the information terminal 104. The system control unit 201 displays the annotation 309 superimposed on the center coordinates of the live view 301 of the overlay management screen 300 according to the setting content of the annotation management table 400.

In step S508, the operator moves the annotation 309 on the live view 301 of the overlay management screen 300 displayed on the information terminal 104, and sets a zoom level at which the annotation is displayed. In the first embodiment, the operator moves the annotation to the position (Pan, Tilt)=(45, 45) that is superimposed on the refrigerator to be monitored, on which the sensor devices 102 and 107 are mounted, and sets the zoom level to 30.

In step S509, upon detecting a change in the PTZ coordinates of the annotation 309 in step S508, the system control unit 201 updates the annotation management table 400 with the changed PTZ coordinates (Pan, Tilt, Zoom)= (45, 45, 30).

In step S510, the operator performs a transition to an action rule setting screen 320 on the information terminal 104 to create an action rule. In the first embodiment, the operator inputs "direct the camera when the door of the refrigerator opens" to the name input section 321, and selects "sensor input" in the condition selection section 322.

Upon detecting that "sensor input" has been selected in the condition selection section 322, the system control unit 201 displays a notification selection section 323 on the action rule setting screen 320. A notification type list of paired sensor devices 102 is displayed in the notification selection section 323.

The operator selects the notification type of the sensor device 102 "Node (6)—Door-Opened" in the notification selection section 323. The operator clicks the action selection section 325 to display a list of selectable actions.

In step S511, the system control unit 201 displays "move to the annotation related to the condition" in FIG. 3C, or performs prohibition processing. This is because displaying an item without the annotation related to the condition may result in creating an unexecutable action rule, and this should be avoided.

Hereinafter, the prohibition processing will be explained with reference to FIG. 6A. In step S601, the system control section 201 acquires the sensor ID based on the setting contents of the condition selection section 322 and the notification selection section 323.

That is, in the first embodiment, the system control unit 201 analyzes the text "sensor input-Node (6)—Door-Opened" generated based on the settings of the condition selection section 322 and the notification selection section 323, and extracts the sensor ID=6.

In step S602, the system control unit 201 initializes the variable annotation ID and the variable loop upper limit, which become the loop processing index to be described below. That is, the system control unit 201 sets the variable annotation ID to 1, and sets the variable loop upper limit to 3, which is the number of annotations in the annotation management table 400. Furthermore, the system control unit 201 sets the variable display flag of the item "move to the annotation related to the condition" to FALSE (non-display).

In step S603, the system control unit 201 repeats the processes of steps S604 to S608 until variable annotation IDs>variable loop upper limit is satisfied. In step S604, the system control unit 201 analyzes the annotation text 402 of the annotation management table 400, extracts the sensor IDs included in the annotation text 402, and sets the extracted sensor IDs to the variable acquisition IDs.

For example, the system control unit 201 extracts the sensor IDs by searching for modifiers #STMP and #SDOOR that include the sensor IDs, and extracting numerical portion from the text that follows the modifiers. In the first embodiment, first, the annotation text 402 "#DATE" of ID=1 of the annotation management table 400 is analyzed. As a result of the analysis, since the sensor ID cannot be found, −1, which means "indefinite", is set in the variable acquisition ID.

In step S605, the system control unit 201 determines whether or not the variable acquisition ID and the variable sensor ID match. In the first embodiment, due to the variable acquisition ID=−1 and the variable sensor ID=6, the determination is "NO", and the process proceeds to step S607.

In step S607, the system control unit 201 increments variable annotation ID by 1, and the process returns to step S603 via step S608. When the annotation ID reach the upper limit of the loop, the flow of FIG. 6A ends.

In step S603, the system control unit 201 advances the process to step S604 because variable annotation ID≤variable loop upper limit is satisfied. In step S604, in the first embodiment, the system control unit 201 analyzes the annotation text 402 with ID=3 of the annotation management table 400 "temperature: #STMP7° C. [line break code] door: #SDOOR6".

As a result of the analysis, since 6 and 7 are found as the sensor IDs, {6, 7} is set as the variable acquisition ID.

In step S605, since, in the first embodiment, variable acquisition ID that matches the variable sensor ID is found due to variable acquisition ID={6, 7} and variable sensor ID=6, the system control unit 201 advances the process to step S606.

In step S606, the system control unit 201 sets the variable display flag to TRUE in order to display "move to an annotation related to a condition"," and ends the flow of the prohibition processing in FIG. 6A. When the variable display flag is TRUE, the system control unit 201 updates the action rule setting screen 320 so that "move to an annotation related to a condition" is displayed.

Thus, according to the flow of FIG. 6A, in the case in which the annotation matching the condition does not exist, the system control unit 201 excludes the setting item of directing the camera to the annotation from the selection target.

The operator continues to create the action rule on the information terminal 104. In the first embodiment, the operator selects "move to an annotation related to a condition" in the action selection section 325.

In step S512, the operator clicks the save button 327 of the action rule setting screen 320 on the information terminal 104. Accordingly, the information terminal 104 transmits a setting save instruction for the action rule setting screen 320 to the network camera 101.

In step S513, the system control unit 201 stores the setting in the action rule management table 410. In the first embodiment, the system control unit 201 assigns ID=1 as a new action rule, and stores the setting content in each item.

In step S514, the system control unit 201 closes the action rule setting screen 320. Here, step S513 functions as a management step (management unit) for managing a predetermined operation when the camera is directed to the annotation.

In step S515, the operator performs transitions to the action rule setting screen 320 on the information terminal 104, and creates an action rule. In the first embodiment, the operator inputs "record when the door of refrigerator is opened" in the name input section 321 and selects "sensor input" in the condition selection section 322.

Additionally, the operator selects the notification type of the sensor device 102 of "Node (6)—Door-Opened" in the notification selection section 323. The operator clicks the action selection section 325 to display a list of selectable actions.

In step S516, the system control unit 201 displays the item "move to an annotation related to a condition" or performs the prohibition processing. Note that since step S516 is the same process as step S511, the description thereof will be omitted. The operator continues to create action rules on the information terminal 104. In the first embodiment, the operator selects "record" in the action selection section 325.

The process in step S517 is the same as the process in step S512, and thus the description thereof will be omitted. In step S518, the system control unit 201 stores the setting in the action rule management table 410. In the first embodiment, the system control unit 201 assigns ID=2 as a new action rule, and stores the setting content in each item.

Since the process in step S519 is the same as the process in step S514, the description thereof will be omitted. In step S520, when the detection unit 214 of the sensor apparatus 102 detects that the door is open, the system control unit 211 of the sensor device 102 provides a notification about detection result to the network camera 101 via the wireless communication unit 213.

In step S521, upon receiving the notification that the door is open from the sensor device 102, the system control unit 201 converts it into the format of the condition of the action rule. That is, in the first embodiment, the conversion to "Node (6)—Door-Opened" is performed. The system control unit 201 searches the action rule management table 410 for an action rule matching the condition 413 using the conversion result as a key.

In step S522, the system control unit 201 acquires the IDs of the action rules (IDs=1 and 2 in the first embodiment) as a result of the search. Next, in step S523, the system control unit 201 executes the action of "move to an annotation related to a condition", which is the action of ID=1 in the action rule management table 410. Specifically, this will be explained with reference to FIG. 6B.

Since the process in step S611 is the same as the process in step S601, the description thereof will be omitted. In step S612, the system control unit 201 sets the variable annotation ID to 1, and sets the variable loop upper limit to 3, which is the number of annotations in the annotation management table 400.

In the succeeding steps S613 to S618, since the processes up to step S615, in which the variable annotation ID becomes 3, are the same as the processes of the steps S603 to S608 in FIG. 6A, the description thereof will be omitted, and the explanation will be continued from the step S615 in which the variable annotation ID becomes 3.

In step S615, since, in the first embodiment, variable acquisition ID that matches the variable sensor ID is found due to variable acquisition ID={6, 7} and variable sensor ID=6, the system control unit 201 advances the process to step S616.

In step S616, the system control unit 201 acquires the PTZ value corresponding to ID=3 in the annotation management table 400, and control of the pan/tilt driving unit 207 according to the acquired value. That is, in the first embodiment, the system control unit 201 moves to (Pan, Tilt, Zoom)=(45, 45, 30), and performs zooming.

Additionally, the system control unit 201 updates the live view 301 of the overlay management screen 300 displayed on the information terminal 104, and ends the flow of FIG. 6B. Here, in the case in which a notification satisfying the predetermined condition is received from the communication device, step S614 to step S616 function as control steps of searching for an annotation related to a predetermined condition from a predetermined annotation management table and directing the camera to the matching annotation.

Next, in step S524 in FIG. 5, the system control unit 201 executes the action "record" that is the action of ID=2 of the action rule management table 410. That is, the system control unit 201 records the video displayed in the live view 301 of the overlay management screen 300 in a predetermined storage destination for a predetermined time.

Thus, in step S524, in a case in which the camera is directed towards the annotation, the system control unit 201 executes a predetermined operation based on a preset rule.

Note that, although, in the first embodiment, the operations as shown in the flowcharts of FIGS. 6A and 6B are performed by the system control unit 201 of the network camera 101, some or all of these operations may be executed by the system control unit 221 of the information terminal 104.

That is, the information terminal 104 may communicate with each of the network camera 101 and the sensor device 102 to control each of them, and thereby the system control unit 221 of the information terminal 104 may execute the above-described prohibition processing, action execution processing, and the like.

Thus, in the first embodiment, the system control unit 201 of the network camera 101 or the system control unit 221 in the information terminal 104, or both of them constitute a communication control apparatus for controlling the above-described prohibition processing, action execution processing, and the like.

Second Embodiment

In the first embodiment, the annotation creation and action rule setting processing in the communication system has been described. In this case, for example, when the annotation 309 is zoomed in step S508, the process may proceed to step S509 and subsequent steps in a state in which the zoom level is set to a level lower than the minimum zoom level 314.

In this case, when the action of "move to an annotation related to a condition" is executed, the temperature and the door open and closed state are not displayed as annotations in the live view 301 of the overlay management screen 300 (annotation symbols are displayed).

Accordingly, in the second embodiment, in the case in which, during execution of the action, the zoom level of the annotation is a zoom level at which the annotation is not displayed, the zoom level is changed. An example thereof will be described with reference to FIG. 7.

Note that in the second embodiment, the explanation is given on the assumption that the operator has moved the annotation to a position (Pan, Tilt)=(45, 45) that is superimposed on the refrigerator to be monitored on which the sensor devices 102 and 107 are mounted, and has zoomed the zoom level to a value 10 that is smaller than the minimum zoom level 314.

Figure 7:
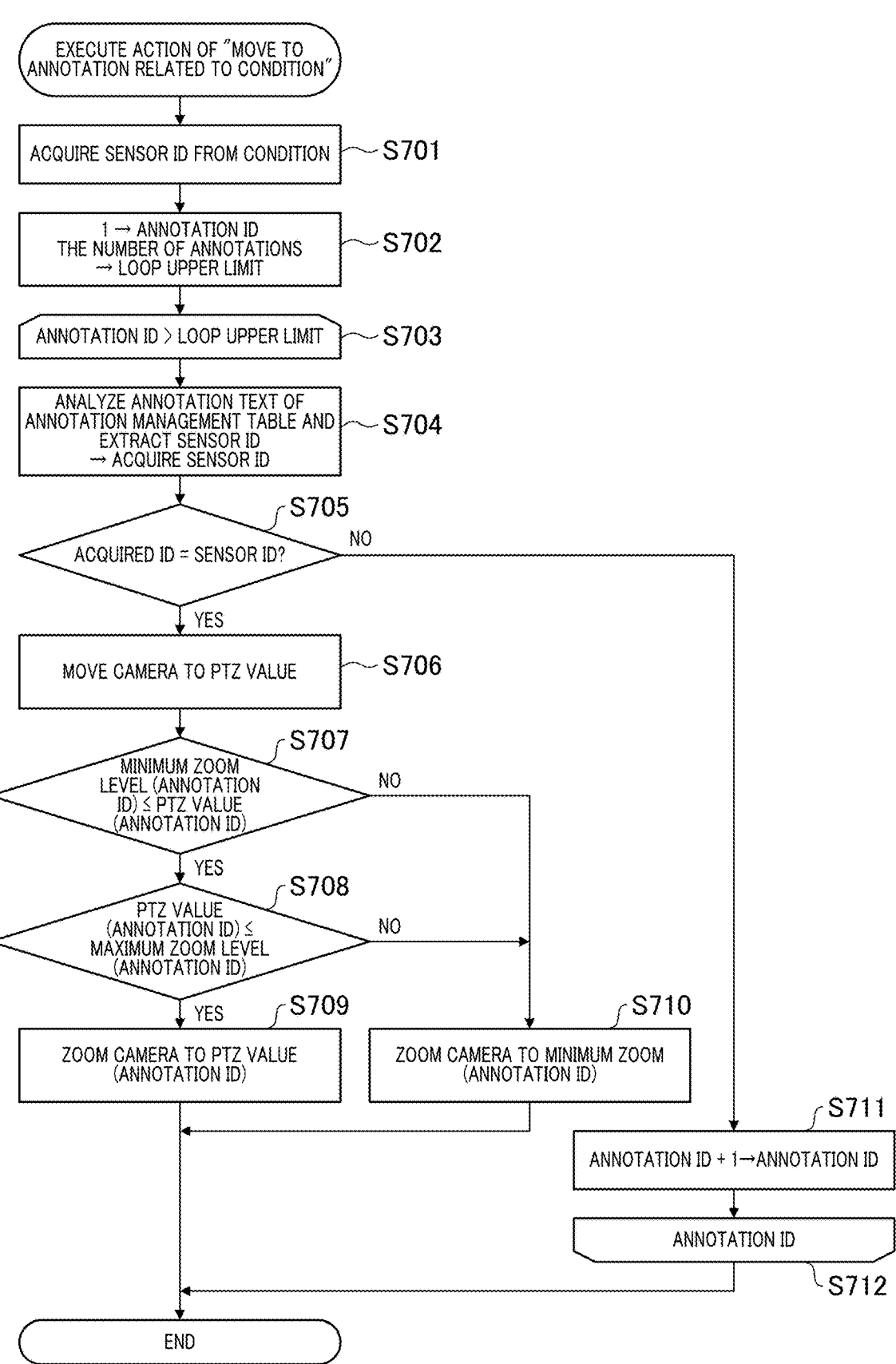
FIG. 7 is a flow chart illustrating a process example of in the second embodiment.

FIG. 7 is a flowchart showing a processing example of the second embodiment, and is for explaining the action execution of "move to an annotation related to a condition" in the second embodiment. Note that the operation of each step in FIG. 7 is performed by the computer in the system control unit 201 executing a computer program stored in the memory.

Since the processes of steps S701 to S704 are the same as the processes of steps S611 to S614 of FIG. 6B, the description thereof will be omitted. In step S705, the system control unit 201 determines whether or not the variable acquisition ID and the variable sensor ID match. In the second embodiment, due to the variable acquisition ID=−1 and the variable sensor ID=6, the process proceeds to step S711.

In step S711, the system control unit 201 increments the variable annotation ID by 1, and process returns to step S703 via step S712. Since the process in step S705 up to variable annotation ID=3 is the same as the process as described above, the description thereof will be omitted.

In step S705, in the first embodiment, since variable acquisition ID that matches the variable sensor ID is found due to variable acquisition ID={6, 7} and variable sensor ID=6, the system control unit 201 advances the process to step S706.

In step S706, the system control unit 201 acquires the PTZ value corresponding to ID=3 in the annotation management table 400, and control of the pan/tilt driving unit 207 is performed according to the acquired PTZ value. In the second embodiment, the system control unit 201 moves pan/tilt driving unit 207 to (Pan, Tilt)=(45, 45).

In step S707 and step S708, the system control unit 201 determines whether or not the zoom level acquired above is included in the range from the minimum zoom level 405 to the maximum zoom level 406 of the annotation management table 400. In the second embodiment, due to the zoom level is 10, while the minimum zoom level 405 of the PTZ value 403 of ID=3 is 20, it is determined that the zoom level is not within the range, and the process proceeds to step S710.

In step S710, the system control unit 201 performs control such that the camera is zoomed to the zoom level of the minimum zoom level 405 of the annotation management table 400. In the second embodiment, control such that the minimum zoom level 405=20 is performed. Thus, in step S710, in a case in which the zoom level of the annotation is outside the displayable range of the annotation, zoom control to a predetermined zoom level within the displayable range is performed.

In the case of "YES" in both step S707 and step S708, the process proceeds to step S709. Since the process in step S709 is the same as the zoom control in step S616, the description thereof will be omitted.

Here, in the second embodiment, the zoom level is changed to a zoom level at which the annotation content is displayed when the action is executed. However, the zoom level may be changed when the annotation is created, when the annotation is moved on the live view 301, or when the zoom level is changed in a state in which the annotation is displayed and may be stored in the annotation management table 400.

As described above, according to the second embodiment, when the action of "move to an annotation related to a condition" is executed regardless of the zoom level, the temperature and the door open/closed state can be displayed as an annotation in the live view 301 of the overlay management screen 300.

Note that, in the first embodiment and the second embodiment, an example using a network camera serving as a camera has been explained. However, cameras include electronic devices having an imaging function such as a digital still camera, a digital movie camera, a smartphone with a camera, a tablet computer with a camera, an in-vehicle camera, a drone camera, and a camera mounted on a robot.

In addition, although, in the first embodiment and the second embodiment, the annotation including the sensor ID set in the condition of the action rule is searched, whether or not the modifier of the annotation corresponding to the notification type matches may be added to the determination condition, in addition to the sensor ID.

For example, the condition text "Door-Opened" and the modifier #SDOOR indicating the door open/closed state may be associated with each other, and a correspondence table for conditions and notification types may be separately prepared. The condition text may be converted into a modifier in the correspondence table, and whether or not the modifier is included in the annotation text 402 of the annotation management table 400 may be determined to search for a match of the annotation associated with the condition, and the present invention includes such a modification.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the information processing apparatus through a network or various storage media. Then, a computer (or a CPU, an MPU, or the like) of the information processing apparatus may be configured to read and execute the program. In such a case, the program and the storage medium storing the program configure the present invention.

Additionally, the present invention includes those realized using, for example, at least one processor or circuit configured to function of the implants explained above. Note that distributed processing may be performed using a plurality of processors.

This application claims the benefit of Japanese Patent Application No. 2022-204075, filed on Dec. 21, 2022, which is hereby incorporated by reference herein in its entirety.

What is claimed is:

1. An information processing apparatus capable of communicating with a communication device, comprising:

at least one processor or circuit configured to function as:

a receiving unit configured to receive a notification that includes a sensor ID assigned to a predetermined sensor of the communication device; and a control unit configured to, in a case in which the receiving unit receives a notification satisfying a predetermined condition from the communication device, search for an annotation related to the condition from a predetermined annotation management table based on the sensor ID included in the notification, wherein the predetermined annotation management table is configured to store the sensor ID, coordinate information of a camera, and an annotation, wherein the coordinate information and the annotation are able to be associated with the sensor ID, wherein the control unit directs the camera to the coordinate corresponding to the coordinate information associated with the sensor ID, in a case in which the annotation associated with the sensor ID exists in the predetermined annotation management table, and wherein the control unit executes a predetermined operation based on a rule set in advance in a case in which the camera is directed to the annotation associated with the sensor ID.

2. The information processing apparatus according to claim 1, wherein, in a case in which the annotation associated with the sensor ID does not exist in the predetermined annotation management table, the control unit excludes a setting item of directing the camera to the annotation from a selection target.

3. The information processing apparatus according to claim 1, wherein, in a case in which a zoom level of the annotation is outside a displayable range of the annotation, the control unit performs zoom control to a predetermined zoom level within the displayable range.

4. The information processing apparatus according to claim 1, wherein the communication device performs communication using a wireless communication method network compliant with at least one of Z-Wave standard, WiFi Aware standard, and ZigBee standard.

5. The information processing apparatus according to claim 1, wherein the control unit can control at least one of panning, tilting, and zooming of the camera.

6. The information processing apparatus according to claim 1, wherein the camera includes a network camera.

7. The information processing apparatus according to claim 1, wherein the predetermined operation includes at least one of an image capturing operation of the camera, direction control of the camera, angle-of-view control of the camera, and recording control of a video from the camera.

8. An information processing method for controlling an information processing apparatus capable of communicating with a communication device, comprising:

receiving a notification that includes a sensor ID assigned to a predetermined sensor of the communication device; and performing control to, in a case in which the receiving receives a notification satisfying a predetermined condition, search for an annotation related to the predetermined condition from a predetermined annotation management table based on the sensor ID included in the notification, wherein the predetermined annotation management table is configured to store the sensor ID, coordinate information of a camera, and an annotation, wherein the coordinate information and the annotation are able to be associated with the sensor ID, wherein the control is performed to direct the camera to the coordinate corresponding to the coordinate information associated with the sensor ID, in a case in which the annotation associated with the sensor ID exists in the predetermined annotation management table, and wherein the control is further performed to execute a predetermined operation based on a rule set in advance in a case in which the camera is directed towards the annotation associated with the sensor ID.

9. A non-transitory computer-readable storage medium configured to store a computer program for controlling an information processing apparatus capable of communicating with a communication device, comprising instructions for executing following processes:

receiving a notification that includes a sensor ID assigned to a predetermined sensor of the communication device; and performing control to, in a case in which the receiving receives a notification satisfying a predetermined condition, search for an annotation related to the predetermined condition from a predetermined annotation management table based on the sensor ID included in the notification, wherein the predetermined annotation management table is configured to store the sensor ID, coordinate information of a camera, and an annotation, wherein the coordinate information and the annotation are able to be associated with the sensor ID, wherein the control is performed to direct the camera to the coordinate corresponding to the coordinate information associated with the sensor ID, in a case in which the annotation associated with the sensor ID exists in the predetermined annotation management table, and wherein the control is further performed to execute a predetermined operation based on a rule set in advance in a case in which the camera is directed towards the annotation associated with the sensor ID.

* * * * *